(12) United States Patent
Cattivelli (10) Patent No.: US 10,728,067 B1
(45) Date of Patent: *Jul. 28, 2020

(54) BLUETOOTH TRANSMITTER WITH STABLE MODULATION INDEX

(71) Applicant: Avago Technologies International Sales Pte. Limited, Singapore (SG)

(72) Inventor: Federico Santiago Cattivelli, Rancho Santa Margarita, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 16/264,592

(22) Filed: Jan. 31, 2019

(51) Int. Cl.
| | | |
|---|---|---|
| *H04L 27/00* | (2006.01) | |
| *H04W 56/00* | (2009.01) | |
| *H04L 27/26* | (2006.01) | |
| *H04L 25/06* | (2006.01) | |
| *H04L 25/03* | (2006.01) | |
| *H04B 17/327* | (2015.01) | |

(52) U.S. Cl.
CPC ....... *H04L 27/0014* (2013.01); *H04B 17/327* (2015.01); *H04L 25/03159* (2013.01); *H04L 25/061* (2013.01); *H04L 27/266* (2013.01); *H04W 56/0035* (2013.01); *H04L 2027/003* (2013.01); *H04L 2027/0016* (2013.01)

(58) Field of Classification Search
CPC combination set(s) only.
See application file for complete search history.

(56) References Cited

U.S. PATENT DOCUMENTS

| | | | | |
|---|---|---|---|---|
| 2005/0220218 A1* | 10/2005 | Jensen | ................ | H04L 27/0008 375/302 |
| 2009/0116541 A1* | 5/2009 | Farrokhi | .............. | H04B 17/345 375/136 |
| 2011/0075780 A1* | 3/2011 | Petrovic | .............. | H03M 1/0614 375/355 |
| 2011/0090991 A1* | 4/2011 | Kim | ..................... | H04L 27/0014 375/324 |
| 2015/0333784 A1* | 11/2015 | Bevan | .................. | H04B 1/1027 455/501 |
| 2015/0349981 A1* | 12/2015 | Tang | ................... | H04L 25/0204 375/260 |
| 2016/0277036 A1* | 9/2016 | Wang | ................... | H03M 13/118 |
| 2017/0295294 A1* | 10/2017 | Takahashi | ............ | H04W 4/026 |
| 2018/0212635 A1* | 7/2018 | Wicaksana | ........... | H04B 5/0056 |
| 2019/0104000 A1* | 4/2019 | Xie | ........................ | H04L 27/122 |
| 2019/0173501 A1* | 6/2019 | Oh | ........................ | H04B 1/0028 |

* cited by examiner

*Primary Examiner* — Linda Wong
(74) *Attorney, Agent, or Firm* — Morgan, Lewis & Bockius LLP (57) ABSTRACT

A stable modulation-index Bluetooth (BT) transmitter circuit includes a baseband modulator circuit to generate a baseband BT signal. An intermediate frequency (IF) circuit adds a frequency offset to the baseband BT signal with a low IF and generates a modulated signal. A digital-to-analog converter (DAC) converts the modulated signal to an analog signal that is upconverted using a voltage controlled oscillator (VCO). The baseband frequency offset is subtracted from the corresponding radio-frequency (RF) signal by reducing the local oscillator (LO) frequency by the same amount. This has the effect of modulating the carrier leakage away from the center frequency of the transmitted BT signal. The resulting RF signal is transmitted to a receiver.

19 Claims, 6 Drawing Sheets

BLUETOOTH TRANSMITTER WITH STABLE MODULATION INDEX

TECHNICAL FIELD

The present description relates generally to integrated circuits and, more particularly to a Bluetooth transmitter with stable modulation index.

BACKGROUND

Many systems and devices use communications based on Bluetooth (BT) standards for communicating with nearby BT-enabled devices. For example, a computer can perform BT communications with portable communication devices, such as one or more tablets, smartphones or smartwatches, or with one or more printers, speakers, sensors or other BT-enabled devices. BT standard (e.g., BT 5.0) introduces a new feature called stable modulation index that applies to BT low-energy (BTLE) modulations such as LE-1 Mbps (LE-1M), LE-2 Mbps (LE-2M), and LE long range (LELR). A transmitting LE device that supports stable modulation index may inform a receiving LE device of this fact. The receiving LE device may benefit from this feature and improve its sensitivity by about 3 dB to 4 dB by using coherent receivers.

On the transmitter side, the difference between standard modulation index and stable modulation index is based on a modulation characteristic parameter called $\Delta fl_{avg}$. The parameter $\Delta fl_{avg}$ is a measurement of the average frequency deviation when transmitting a bit sequence consisting of 11110000. The requirement for $\Delta fl_{avg}$ parameter is less restricted for standard modulation index than for stable modulation index. For example, for LE-1M and LELR, the range of values for the parameter $\Delta fl_{avg}$ is between 225 KHz and 275 KHz, for standard modulation index, and between 247.6 KHz and 252.5 KHz, for stable modulation index. Similarly, for LE-2M, the range of values for the parameter $\Delta fl_{avg}$ is between 450 KHz and 550 KHz, for standard modulation index, and between 495 KHz and 505 KHz, for stable modulation index. LE receivers can benefit from stable modulation transmitters by leveraging a coherent detection scheme or a maximum-likelihood sequence estimation (MLSE) demodulator. These demodulators can provide about 3 to 4 dB improvement in sensitivity relative to a standard non-coherent Gaussian frequency-shift keying (GFSK) demodulator.

Typically, MLSE or coherent demodulation schemes cannot be employed for standard modulation index, as they may not work properly when an LE transmitter uses a dirty transmit (TX). This may prevent the device from passing bench qualification. A substantial improvement in sensitivity with stable modulation index can be expected. Improvements of between 0.5 dB and 4 dB have been demonstrated for all LE rates, including LE-1M, LE2M, LELR-125 Kbps and LELR-500 Kbps.

BRIEF DESCRIPTION OF THE DRAWINGS

Certain features of the subject technology are set forth in the appended claims. However, for purposes of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute part of the detailed description. The detailed description includes specific details for the purpose of providing a thorough understanding of the subject technology. However, the subject technology is not limited to the specific details set forth herein and may be practiced without one or more of the specific details. In some instances, structures and components are shown in a block diagram form in order to avoid obscuring the concepts of the subject technology.

The subject technology is directed to a Bluetooth (BT) transmitter with stable modulation index. The subject technology allows a BT transmitter to achieve stable modulation index compliance by adding a small intermediate frequency (IF) to the respective transmit (TX) signal. It has been observed that modulation index, as measured by the BT standard, is greatly dependent on the carrier leakage of the TX signal. The carrier leakage can be present due to multiple reasons, for example, a DC offset in the digital transmitted signal, a DC offset in the analog circuitry before the RF mixer, or local-oscillator feedthrough (LOFT). By applying a small IF at baseband, and compensating it in the RF signal, the carrier leakage can be modulated away from the center of the transmitted RF signal, thereby reducing the modulation index variation and achieving stable modulation index compliance.

The applied IF cannot be too large, otherwise it will degrade other aspects of the BT signal, such as in-band spurs. The IF can be implemented by inserting a small frequency offset in the digital modulated signal, that is, by multiplying the complex baseband signal by $e^{j2\pi fIF/fs}$, where fIF is the desired IF frequency, and fs is the sample rate of the (digital) baseband signal. The frequency offset is compensated in the RF domain by reducing the frequency of the voltage-controlled oscillator (VCO) in such a way that the frequency of the local oscillator (LO) is reduced by an identical amount. The subject technology can be beneficial to many wireless devices that use BT low-energy (BTLE) standard, including LE-1M, LE-2M and low-energy long range (LELR) standard. The disclosed solution allows a BT receiver to improve its sensitivity by, for example, about 3 dB to 4 dB, upon enabling coherent demodulation. It is understood that an increase in sensitivity translates to an increase in range and robustness to noise and fading.

Figure 1:
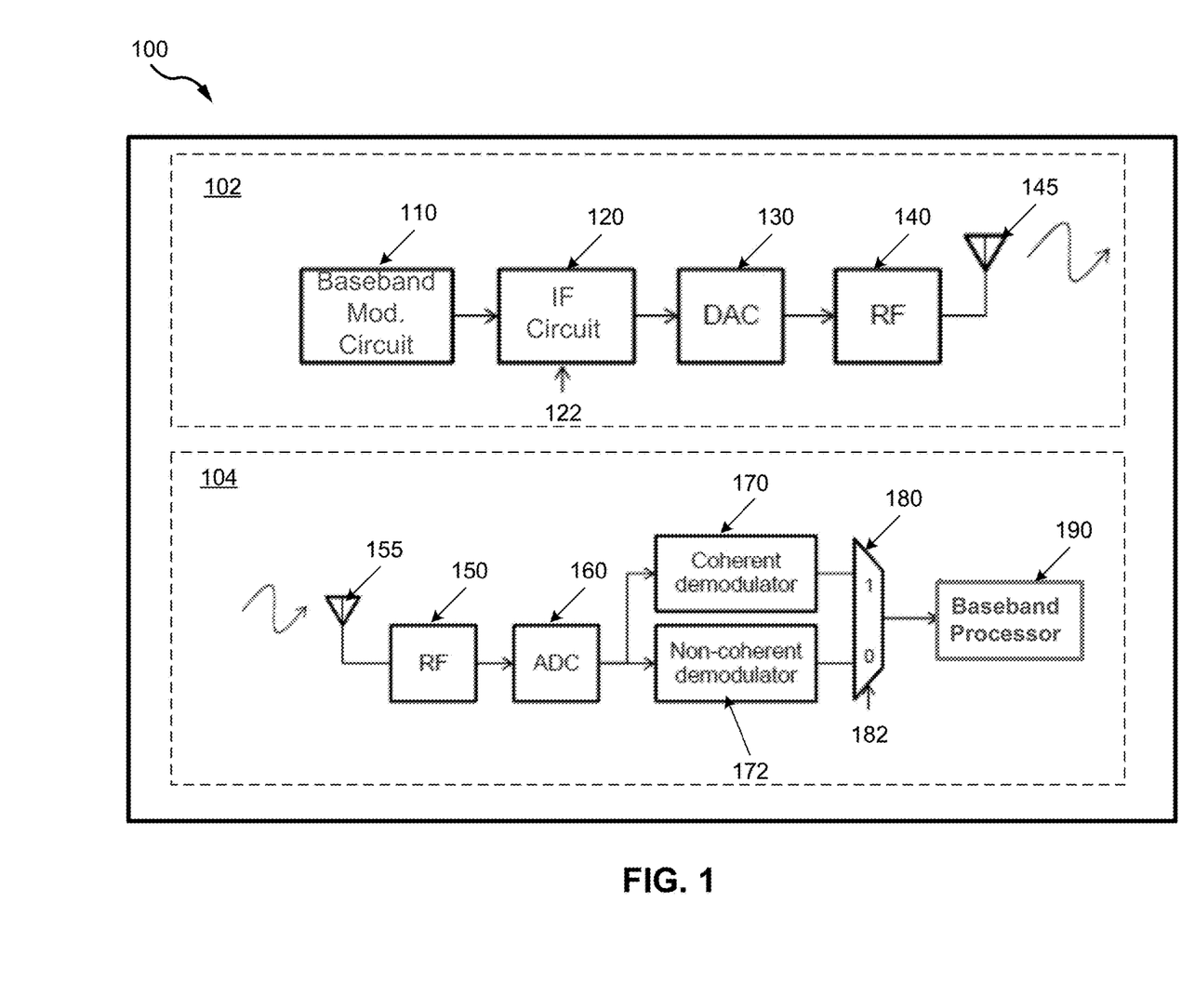
FIG. 1 is a block diagram illustrating an example of a Bluetooth (BT) transceiver featuring a stable modulation index, in accordance with one or more aspects of the subject technology.

FIG. 1 is a block diagram illustrating an example of a BT transceiver 100 featuring a stable modulation index, in accordance with one or more aspects of the subject technology. The BT transceiver 100 includes a BT transmitter circuit 102 (hereinafter, "BT transmitter 102") and a BT receiver circuit 104 (hereinafter, "BT receiver 104") that can communicate with each other using a BT standard such as a BTLE standard (e.g., BT 5.0), which includes LE-1M, LE-2M and LELR. The BT transmitter 102 is capable of transmitting radio-frequency (RF) signals with stable modulation index, as discussed herein. This allows the BT receiver 104 to improve its sensitivity by leveraging a coherent modulation scheme, as explained below.

The BT transmitter 102 includes a baseband modulation circuit 110, an intermediate frequency (IF) circuit 120, a digital-to-analog converter (DAC) 130, an RF circuit 140 and a TX antenna 145. The baseband modulation circuit includes suitable circuitry, logic and/or code that can modulate a signal using one of a number of modulation schemes, and to generate a baseband BT signal. The IF circuit 120 includes suitable circuitry, logic and/or code that can add a frequency offset to the baseband BT signal by using an IF signal 122. For example, the IF circuit 120 can multiply the complex baseband signal by $e^{j2\pi fIF/fs}$, where fIF is the desired IF frequency, and fs is the sample rate of the (digital) baseband signal. The same frequency offset is later subtracted from the RF signal by reducing the LO frequency by an amount equal to fIF. The IF circuit 120 enables reducing the modulation-index variation of the BT transmitter 102 by modulating the carrier leakage away from the center of the transmitted BT signal. The carrier leakage can be due to a DC offset in the baseband BT signal, DC offset added in the DAC 130 or the analog stages of the RF portion 140, or LO feedthrough (LOFT). The IF signal 122 is a small signal with a low frequency (e.g., within a range of a few Hz to 1 MHz, such as 23 KHz). The output of the IF circuit is a digital modulated signal. It is understood that the RF circuit 140 includes a VCO that is used to generate the LO signal. In some implementations, a frequency of the LO is reduced by an amount substantially identical to a frequency of the IF signal.

The digital modulated signal output of IF circuit 120 is converted to an analog signal by the DAC 130. The analog signal generated by the DAC 130 is then provided to the RF circuit 140 for transmission by the RF antenna 145. The RF circuit 140 is a known circuit and may include one or more power-amplifier stages. It is an advantageous feature of the subject technology that the BT transmitter 102 can be implemented with almost no area or power penalty compared to a BT transmitter that only supports standard modulation index.

The RF signal transmitted by the BT transmitter 102 has a stable modulation index, which is different from a standard modulation index, and the difference is based on a modulation characteristic parameter called $\Delta fl_{avg}$. The parameter $\Delta fl_{avg}$ is a measurement of the average frequency deviation when transmitting a bit sequence consisting of 11110000. The requirement for $\Delta fl_{avg}$ parameter is more restricted for the stable modulation index than for the standard modulation index. For example, for LE-1M and LELR, the range of values for the parameter $\Delta fl_{avg}$, for stable modulation index, is between 247.6 KHz and 252.5 KHz. Whereas for standard modulation index, the range is between 225 KHz and 275 KHz. Similarly, for LE-2M, the range of values for the parameter $\Delta fl_{avg}$ is between 495 KHz and 505 KHz, for stable modulation index, and between 450 KHz and 550 KHz for standard modulation index.

The BT receiver 104 includes a RX antenna 155, an RF circuit 150, an analog-to-digital converter (ADC) 160, a coherent demodulator 170, a non-coherent demodulator 172, a multiplexer 180 and a baseband processor 190. The RX antenna 155 receives an RF signal transmitted by the TX antenna 145 and provides the RF signal to the RF circuit 150. The RF circuit 150 is a known circuit, typically including one or more low-noise amplifiers, a mixer, a filter and one or more variable-gain amplifiers (VGAs). The ADC 160 converts an analog signal output of the RF circuit to a digital signal for digital demodulation. The digital demodulation can be performed by the coherent demodulator 170 or the non-coherent demodulator 172. In one or more implementations, the coherent demodulator 170 is enabled if the RF signal received by the RF circuit 150 has a stable modulation index. In some implementations, the BT transmitter 102 transmits information regarding the modulation index to the BT receiver 104, and in response, the BT receiver 104 enables the coherent demodulator 170 based on the information received from the BT transmitter 102. The BT receiver 104 can improve its sensitivity, for example, by about 3 dB to 4 dB, when using the coherent demodulator 170. This translates into an increase in the receiver range and the robustness to noise and fading.

In one or more implementations, the multiplexer 180 can pass an output of one of the coherent demodulator 170 or the non-coherent demodulator 172 in response to a selection signal 182. The BT 104 can set the selection signal 182 based on the information received from the BT transmitter 102. For example, if the information received from the BT transmitter 102 indicates that the RF signal transmitted by the BT transmitter 102 has a stable modulation index, the value of the selection signal 182 is set to 1, which enables the output of the coherent demodulator 170 to pass to the baseband processor 190. Otherwise, in the absence of stable modulation index, the BT receiver 104 disables the coherent demodulator 170, enables the non-coherent demodulator 172, and sets the selection signal 182 to zero to use the output of the non-coherent demodulator 172 for further processing. In one or more implementations, the BT receiver 104 determines an average received-signal strength indicator (RSSI) of signal packets received from the BT transmitter 102, and compares the RSSI with a threshold value (e.g., within a range of about −95 dBm to −80 dBm). If the RSSI is less than the threshold value, the BT receiver 104 enables the coherent demodulator 170 and sets the selection signal 182 to 1.

Figure 2A:
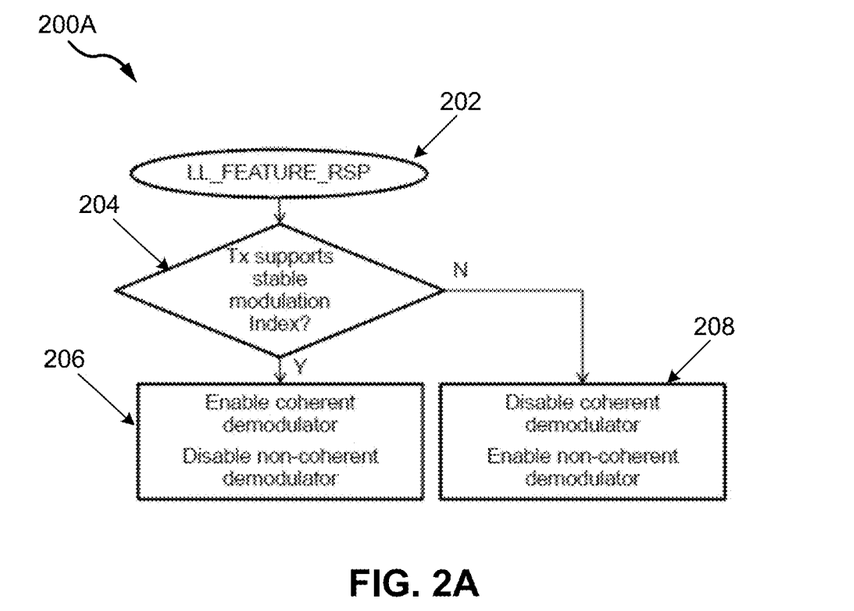
FIGS. 2A and 2B are flow diagrams illustrating example methods of receiving a signal from a stable modulation index transmitter, in accordance with one or more aspects of the subject technology.
Figure 2B:
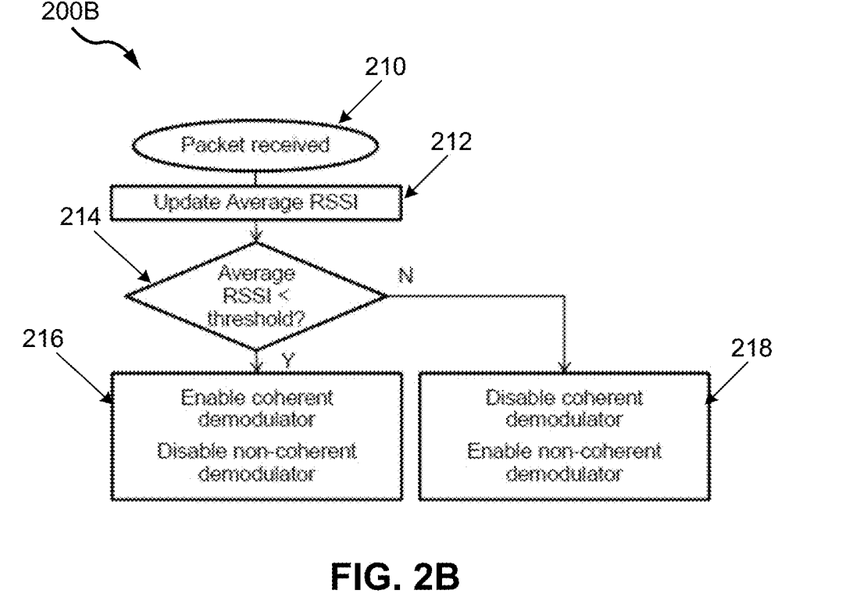

FIGS. 2A and 2B are flow diagrams illustrating example methods 200A and 200B of receiving a signal from a stable modulation index transmitter, in accordance with one or more aspects of the subject technology. The method 200A starts at operation block 202, where, in response to a request command sent to the BT transmitter 102 of FIG. 1 from the BT receiver 104 of FIG. 1, a response command including a parameter LL_FEATURE_RSP is received from the BT transmitter 102. At control block 204, the BT receiver 104 determines whether the BT transmitter 102 supports stable modulation index or not. If it is determined that the BT transmitter 102 supports stable modulation index, at operation block 206, coherent demodulator 170 is enabled and non-coherent demodulator 172 is disabled. Otherwise, if it is determined that the BT transmitter 102 does not support stable modulation index, at operation block 208, coherent demodulator 170 is disabled and non-coherent demodulator 172 is enabled.

The method 200B starts at operation block 210, where signal packets are received at the BT receiver 104 from the BT transmitter 102. At operation block 212, the BT receiver 104 updates a previously determined average value of the RSSI ($RSSI_{ave}$) of the received signal packets. At control block 214, the BT receiver 104 compares $RSSI_{ave}$ with a threshold value (e.g., within a range of about −95 dBm to −80 dBm). If $RSSI_{ave}$ is less than the threshold, at operation block 216, the BT receiver 104 enables coherent demodulator 170 and disables the non-coherent demodulator 172, regardless of the BT transmitter 102 supporting or not supporting stable modulation index. Otherwise, if $RSSI_{ave}$ is not less than the threshold, at operation block 218, coherent demodulator 170 is disabled and non-coherent demodulator 172 is enabled for the sake of power saving.

Figure 3:
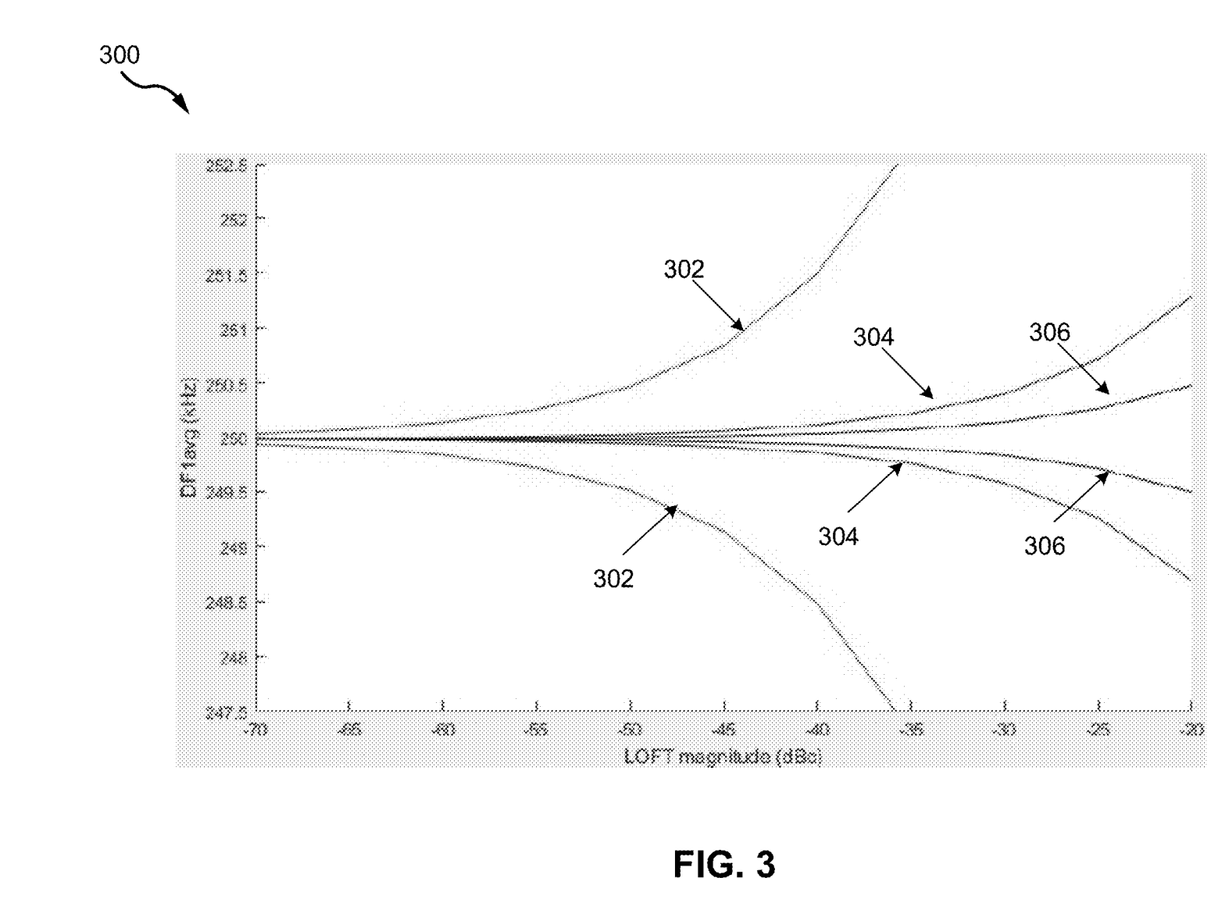
FIG. 3 is a chart illustrating plots of values of the parameter $\Delta fl_{avg}$ versus local oscillator feed-through (LOFT) values, in accordance with one or more aspects of the subject technology.

FIG. 3 is a chart illustrating plots 302, 304 and 306 of values of the parameter $\Delta fl_{avg}$ versus LOFT values, in accordance with one or more aspects of the subject technology. Plots 302, 304 and 306 are simulation results and show variations of values of the parameter $\Delta fl_{avg}$ versus LOFT magnitude (in dBc) for TX IF frequencies of 0 KHz, 11.719 KHz and 23.438 KHz. These plots are a good indication that adding the TX IF frequency can significantly improve robustness to LOFT, as the values of the parameter $\Delta fl_{avg}$ are decreased by increasing the TX IF frequency. The TX IF signifies the IF signal 122 of FIG. 1.

It is helpful at this point to have a better understanding of how the LOFT affects an instantaneous frequency ($f_{inst}$) of a desired signal $e^{j2\pi f_c t}$ with an additive DC offset $\alpha$. The instantaneous frequency ($f_{inst}$) can be expressed as:

$$f_{inst} = \frac{1}{2\pi}\frac{d}{dt}\lfloor \text{angle}(a + e^{j2\pi f_c t})\rfloor \quad (1)$$

The above expression (1) can be approximated for small values of DC offset $\alpha$ as below:

$$f_{inst} \approx f_c \lfloor 1 - |a|\cos(2\pi f_c t - \theta_\alpha)\rfloor \quad (2)$$

The expression (2) shows that the instantaneous frequency ($f_{inst}$) is modulated by a sinewave that is proportional to the magnitude of the DC offset. For BTLE, the $f_c$ is 250 KHz, which corresponds to a period of the modulating sinewave of 4 symbols. Further, the phase of the modulating sinewave is a function of the DC offset phase.

Figure 4:
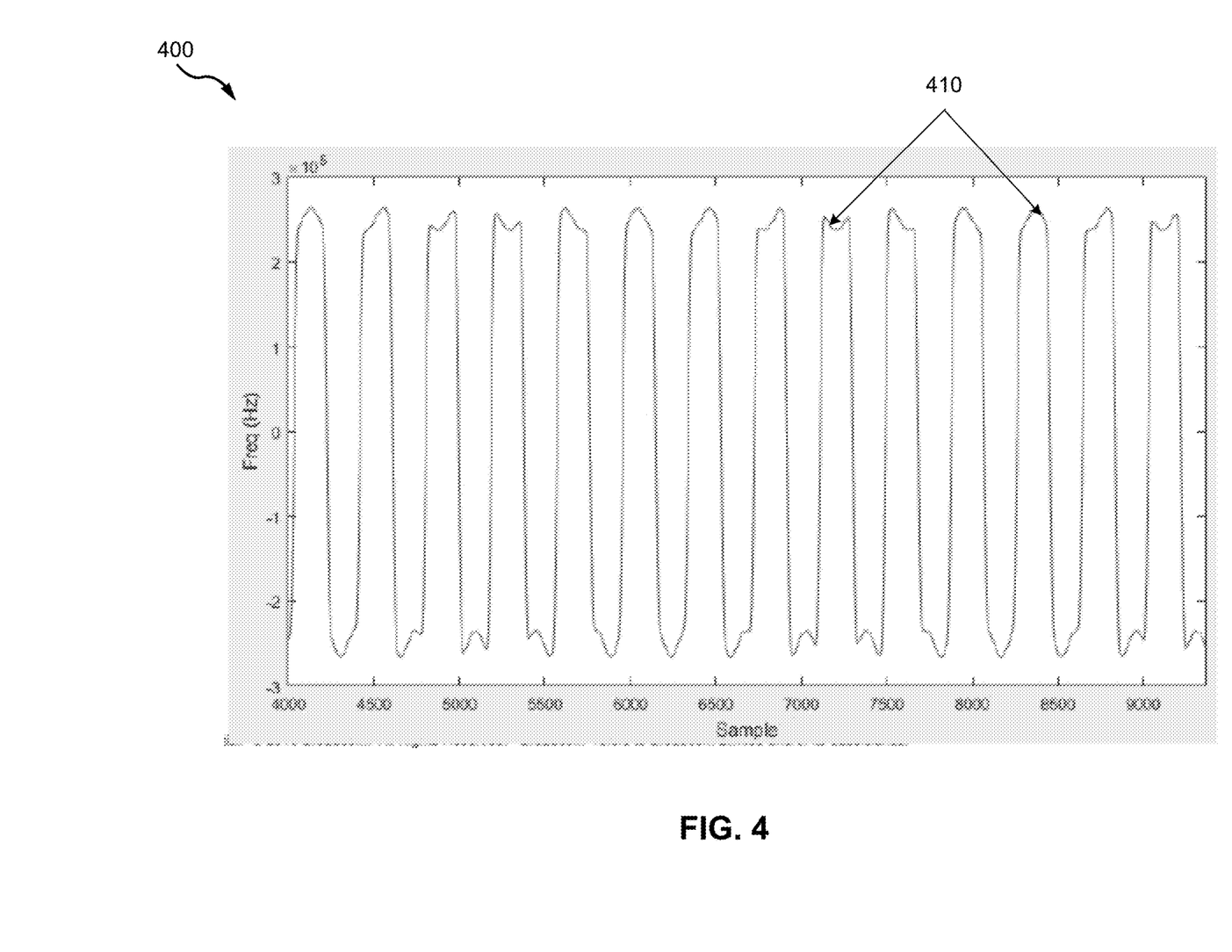
FIG. 4 is a chart illustrating a plot of simulated frequency deviation versus sample numbers of an 8-bit pattern, in accordance with one or more aspects of the subject technology.

FIG. 4 is a chart 400 illustrating a plot 410 of simulated frequency deviation versus sample numbers of an 8-bit pattern, in accordance with one or more aspects of the subject technology. The parameter $\Delta fl_{avg}$ discussed above with respect to FIG. 1 can be a measurement of the average frequency deviation when a packet including an 8-bit sequence (11110000) consisting of four consecutive 1 bits followed by four consecutive 0 bits is transmitted by the BT transmitter supporting stable modulation index (e.g., 102 of FIG. 1). The 1 bits are signals with +250 KHz frequency and the 0 bits are at −250 KHz. The plot 410 shows simulated frequency deviations versus sample numbers of 8-bit patterns. The simulation is for bits 2, 3, 6 and 7 of each 8-bit pattern and averaged over the entire packet. As shown in the plot 410, the top and bottom portion of the curve are not flat and show a small deviation, due to the effect of the LOFT, from the +250 KHz and −250 KHz. The effect of the LOFT, however, is averaged out when TX IF increases.

Figure 5:
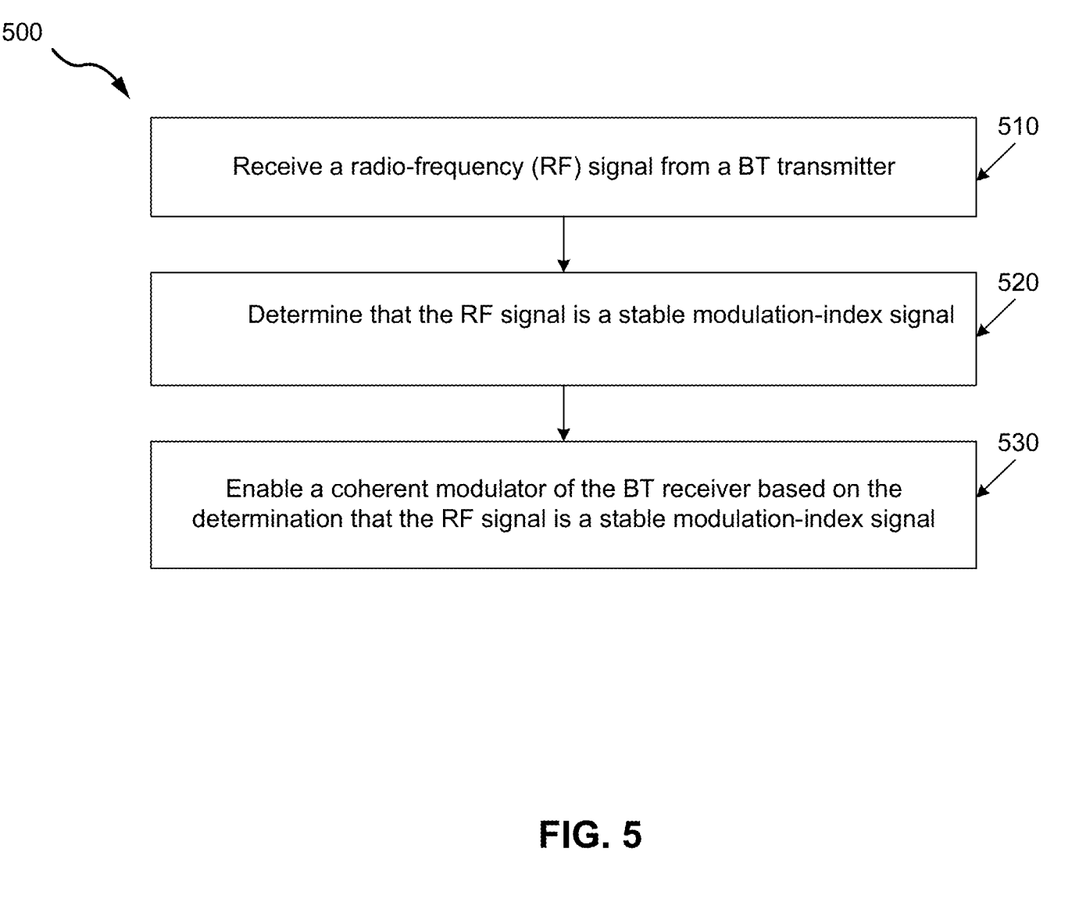
FIG. 5 is a flow diagram illustrating an example method for increasing sensitivity of a BT receiver.

FIG. 5 is a flow diagram illustrating an example method 500 for increasing sensitivity of a BT receiver (e.g., 104 of FIG. 1). The method 500 starts with receiving a RF signal from a BT transmitter (e.g., 102 of FIG. 1) (510). The method 500 further includes determining that the RF signal is a stable modulation-index signal (e.g., at 204 of FIG. 2A or 214 of FIG. 2B) (520). A coherent modulator (e.g., 170 of FIG. 1) of the BT receiver is enabled based on the determination (e.g., at 206 of FIG. 2A or 216 of FIG. 2B) that the RF signal is a stable modulation-index signal (530).

Figure 6:
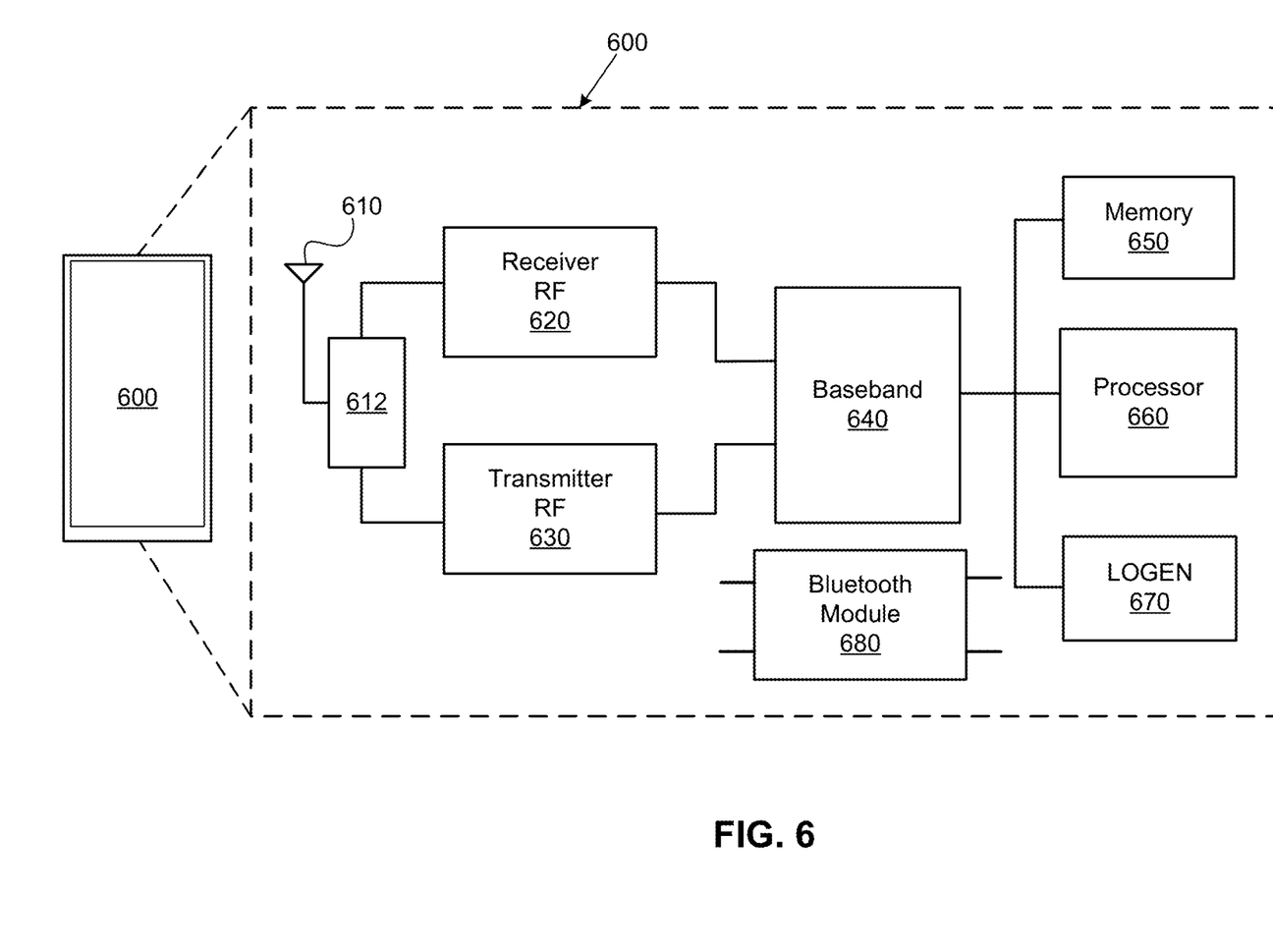
FIG. 6 is a block diagram illustrating a wireless communication device, within which one or more aspects of the subject technology can be implemented.

FIG. 6 is a block diagram illustrating a wireless communication device, within which one or more aspects of the subject technology can be implemented. In one or more implementations, the wireless communication device 600 can be a mobile phone, a tablet or any other wireless communication device that is enabled for receiving wireless power. The wireless communication device 600 may comprise an RF antenna 610, a duplexer 612, a receiver 620, a transmitter 630, a baseband processing module 640, a memory 650, a processor 660, a local oscillator generator (LOGEN) 670 and a BT module 680. In various embodiments of the subject technology, one or more of the blocks represented in FIG. 6 may be integrated on one or more semiconductor substrates. For example, the blocks 620-670 may be realized in a single chip or a single system on a chip, or may be realized in a multichip chipset.

The receiver 620 may comprise suitable logic circuitry and/or code that may be operable to receive and process signals from the RF antenna 610. The receiver 620 may, for example, be operable to amplify and/or down-convert received wireless signals. In various embodiments of the subject technology, the receiver 620 may be operable to cancel noise in received signals and may be linear over a wide range of frequencies. In this manner, the receiver 620 may be suitable for receiving signals in accordance with a variety of wireless standards, including Wi-Fi, WiMAX, BT, and various cellular standards. In various embodiments of the subject technology, the receiver 620 may not require any surface acoustic wave (SAW) filters and few or no off-chip discrete components such as large capacitors and inductors.

The transmitter 630 may comprise suitable logic circuitry and/or code that may be operable to process and transmit signals from the RF antenna 610. The transmitter 630 may, for example, be operable to up-convert baseband signals to RF signals and amplify RF signals. In various embodiments of the subject technology, the transmitter 630 may be operable to up-convert and amplify baseband signals processed in accordance with a variety of wireless standards. Examples of such standards may include Wi-Fi, WiMAX, BT, and various cellular standards. In various embodiments of the subject technology, the transmitter 630 may be operable to provide signals for further amplification by one or more power amplifiers.

The duplexer 612 may provide isolation in the transmit band to avoid saturation of the receiver 620 or damaging parts of the receiver 620, and to relax one or more design requirements of the receiver 620. Furthermore, the duplexer 612 may attenuate the noise in the receive band. The duplexer may be operable in multiple frequency bands of various wireless standards.

The baseband processing module 640 may comprise suitable logic, circuitry, interfaces, and/or code that may be operable to perform processing of baseband signals. The baseband processing module 640 may, for example, analyze received signals and generate control and/or feedback signals for configuring various components of the wireless communication device 600, such as the receiver 620. The baseband processing module 640 may be operable to encode, decode, transcode, modulate, demodulate, encrypt, decrypt, scramble, descramble, and/or otherwise process data in accordance with one or more wireless standards.

The processor 660 may comprise suitable logic, circuitry, and/or code that may enable processing data and/or controlling operations of the wireless communication device 600. In this regard, the processor 660 may be enabled to provide control signals to various other portions of the wireless communication device 600. The processor 660 may also control transfer of data between various portions of the wireless communication device 600. Additionally, the processor 660 may enable implementation of an operating system or otherwise execute code to manage operations of the wireless communication device 600.

The memory 650 may comprise suitable logic, circuitry, and/or code that may enable storage of various types of information such as received data, generated data, code, and/or configuration information. The memory 650 may comprise, for example, RAM, ROM, flash, and/or magnetic storage. In various embodiments of the subject technology, information stored in the memory 650 may be utilized for configuring the receiver 620 and/or the baseband processing module 640.

The LOGEN 670 may comprise suitable logic, circuitry, interfaces, and/or code that may be operable to generate one or more oscillating signals of one or more frequencies. The LOGEN 670 may be operable to generate digital and/or analog signals. In this manner, the LOGEN 670 may be operable to generate one or more clock signals and/or sinusoidal signals. Characteristics of the oscillating signals such as the frequency and duty cycle may be determined based on one or more control signals from, for example, the processor 660 and/or the baseband processing module 640.

In operation, the processor 660 may configure the various components of the wireless communication device 600 based on a wireless standard according to which it is desired to receive signals. Wireless signals may be received via the RF antenna 610, amplified, and down-converted by the receiver 620. The baseband processing module 640 may perform noise estimation and/or noise cancellation, decoding, and/or demodulation of the baseband signals. In this manner, information in the received signal may be recovered and utilized appropriately. For example, the information may be audio and/or video to be presented to a user of the wireless communication device, data to be stored to the memory 650, and/or information affecting and/or enabling operation of the wireless communication device 600. The baseband processing module 640 may modulate, encode, and perform other processing on audio, video, and/or control signals to be transmitted by the transmitter 630 in accordance with various wireless standards.

In one or more implementations, the BT module 680 includes circuits and logic for adding an IF frequency to the baseband signal and remove it from the corresponding RF signal, in order to modulate a carrier leakage away from the center of the desired transmit frequency. This can reduce the modulation index variation to achieve a stable modulation index and allows a BT receiver of the wireless communication device 600 to enable coherent modulation to improve its sensitivity by about 3 dB to 4 dB.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to," "operable to," and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A word such as "aspect" does not imply that such aspect is essential to the subject technology or that such aspect applies to all configurations of the subject technology. A disclosure relating to an aspect may apply to all configurations, or one or more configurations. A word such as "aspect" may refer to one or more aspects and vice versa. A word such as "configuration" does not imply that such configuration is essential to the subject technology or that such configuration applies to all configurations of the subject technology. A disclosure relating to a configuration may apply to all configurations, or one or more configurations. A word such as "configuration" may refer to one or more configurations and vice versa.

The word "example" is used herein to mean "serving as an example or illustration." Any aspect or design described herein as an "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A stable modulation-index Bluetooth (BT) transmitter circuit, the transmitter circuit comprising:
   a baseband modulator circuit configured to generate a baseband BT signal;
   an intermediate frequency (IF) circuit configured to add a frequency offset to the baseband BT signal and to generate a modulated digital signal;
   a digital-to-analog converter (DAC) configured to convert the modulated digital signal to a baseband analog signal; and
   a local oscillator (LO) configured to upconvert the baseband analog signal to a radio-frequency (RF) signal; and
   a power amplifier and an antenna to transmit the RF signal to a receiver,
   wherein the modulated digital RF signal is generated by making an adjustment to an LO frequency equal and opposite in sign to the frequency offset added to the baseband BT signal.

2. The transmitter circuit of claim 1, wherein the IF circuit is configured to enable a coherent receiving by the receiver through reducing modulation-index variation of the BT transmitter circuit.

3. The transmitter circuit of claim 2, wherein the IF circuit is configured to reduce the modulation-index variation of the BT transmitter circuit by adding the frequency offset to the baseband BT signal.

4. The transmitter circuit of claim 1, wherein the transmitter circuit is configured to add the frequency offset to the baseband BT signal and remove the frequency offset from the LO frequency to shift a carrier leakage away from a center of a transmit signal, the carrier leakage being caused by a DC offset in the baseband BT signal or a local-oscillator feedthrough (LOFT).

5. The transmitter circuit of claim 1, wherein the IF circuit is configured to add the frequency offset to the baseband BT signal away from a signal frequency.

6. The transmitter circuit of claim 1, wherein the IF circuit is configured to add the frequency offset to the baseband BT signal with a low-frequency IF, wherein a frequency of the low-frequency IF is within a range of about a few 2 Hz to 1 MHz several KHz.

7. The transmitter circuit of claim 1, wherein the LO comprises a voltage-controlled oscillator (VCO), and wherein a frequency of the LO frequency is reduced by an amount substantially identical to a frequency of the IF signal.

8. The transmitter circuit of claim 1, wherein the BT transmitter circuit comprises at least one of a BT low-energy (BTLE) transmitter or a BT long range (BTLR) transmitter.

9. The transmitter circuit of claim 1, wherein the BT transmitter circuit is implemented with almost no area or power penalty.

10. The transmitter circuit of claim 1, wherein BT transmitter circuit is configured to inform the receiver of a stable-modulation index of a transmitted signal.

11. A Bluetooth (BT) transceiver comprising:
a BT transmitter configured to transmit a first radio-frequency (RF) signal with a stable modulation index, the BT transmitter including a baseband modulator circuit and an intermediate frequency (IF) circuit, wherein the IF circuit is configured to add a frequency offset to a modulated signal of the baseband modulator circuit with an IF and to subtract the frequency offset from the LO to generate the RF signal with stable modulation index; and
a BT receiver configured to receive a second RF signal, the BT receiver comprising:
an analog-to-digital converter (ADC) to convert the second RF signal to a digital signal;
a non-coherent demodulator configured to demodulate the digital signal using a non-coherent modulation scheme; and
a coherent demodulator configured to demodulate the digital signal using a coherent modulation scheme,
wherein the BT receiver is configured to select an output signal of one of the non-coherent demodulator or the coherent demodulator based on information received in the second RF signal.

12. The BT transceiver of claim 11, wherein the BT receiver further includes a multiplexer coupled to the coherent demodulator and the non-coherent demodulator, and
wherein the multiplexer is configured to select the output signal of one of the coherent demodulator or the non-coherent demodulator based on the information received in the second RF signal.

13. The BT transceiver of claim 12, wherein the BT receiver is configured to determine an average received-signal strength indicator (RSSI) of signal packets received in the second RF signal.

14. The BT transceiver of claim 12, wherein the BT receiver is configured to determine whether an average RSSI of signal packets received in the second RF signal is smaller than a threshold value, and
wherein the multiplexer is configured to select the output signal of the coherent demodulator when the average RSSE is smaller than the threshold value.

15. The BT transceiver of claim 14, wherein the threshold value is within a range of about −95 dBm to −80 dBm.

16. A method of increasing sensitivity of a Bluetooth (BT) receiver, the method comprising:
receiving a radio-frequency (RF) signal from a BT transmitter;
determining if the RF signal is a stable modulation-index signal;
enabling a non-coherent demodulator of the BT receiver based on a determination that the RF signal is not a stable modulation-index signal; and
enabling a coherent demodulator of the BT receiver based on a determination that the RF signal is a stable modulation-index signal.

17. The method of claim 16, further comprising receiving information from the BT transmitter relating to the stable modulation-index signal, and enabling the coherent demodulator of the BT receiver based on the received information, and wherein the sensitivity of the BT receiver is increased by about 3 dB to 4 dB.

18. The method of claim 16, further comprising determining that an average received-signal strength indicator (RSSI) of signal packets received from the BT transmitter is smaller than a threshold value, wherein the coherent demodulator is enabled based on the determination that the RSSI is smaller than the threshold value.

19. The method of claim 18, wherein the threshold value is within a range of −95 dBm to −80 dBm.

* * * * *

UNITED STATES PATENT AND TRADEMARK OFFICE
CERTIFICATE OF CORRECTION

| | | |
|---|---|---|
| PATENT NO. | : 10,728,067 B1 | Page 1 of 1 |
| APPLICATION NO. | : 16/264592 | |
| DATED | : July 28, 2020 | |
| INVENTOR(S) | : Cattivelli | |

It is certified that error appears in the above-identified patent and that said Letters Patent is hereby corrected as shown below:

In the Claims

Column 10, Line 24 (Claim 14): Replace "RSSE" with --RSSI--.

Signed and Sealed this
Eighth Day of September, 2020

Andrei Iancu
*Director of the United States Patent and Trademark Office*